US005478225A

United States Patent [19]

Takeuchi et al.

[11] Patent Number: 5,478,225

[45] Date of Patent: Dec. 26, 1995

[54] TOOL SET TYPE POWDER COMPACTING PRESS

[75] Inventors: Kenji Takeuchi, Itami; Yoshiaki Horie; Hiromoto Sei, both of Shizuoka, all of Japan

[73] Assignees: Sumitomo Electric Industries, Ltd., Osaka; Kohtaki Precision Machine Co., Ltd., Shizuoka, both of Japan

[21] Appl. No.: 258,993

[22] Filed: Jun. 13, 1994

[30] Foreign Application Priority Data

Jun. 14, 1993 [JP] Japan .................................... 5-141842

[51] Int. Cl.[6] .................................................... B29C 43/00

[52] U.S. Cl. ............................ 425/78; 425/150; 425/193; 425/352; 425/406

[58] Field of Search .................................... 425/193, 183, 425/195, 78, 352, 150, 354, 355, 406

[56] References Cited

U.S. PATENT DOCUMENTS

| | | | |
|---|---|---|---|
| 3,111,053 | 11/1963 | Svensson | 83/124 |
| 3,172,182 | 3/1965 | Assmann | 425/193 |
| 3,353,215 | 11/1967 | Haller | 425/78 |
| 3,561,056 | 2/1971 | Smith et al. | 425/193 |
| 4,347,051 | 8/1982 | DeSantis | 425/193 |
| 4,456,445 | 6/1984 | DeSantis et al. | 425/193 |
| 4,531,901 | 7/1985 | Andersen | 425/193 |
| 4,714,421 | 12/1987 | D'Agostino | 425/195 |
| 4,890,998 | 1/1990 | Gräbener et al. | 425/193 |
| 5,049,054 | 9/1991 | Schaidl et al. | 425/78 |
| 5,326,242 | 7/1994 | Katagiri et al. | 425/78 |

FOREIGN PATENT DOCUMENTS

| | | | |
|---|---|---|---|
| 0077897 | 5/1983 | European Pat. Off. . | |
| 1255555 | 10/1961 | Germany | 425/193 |
| 9110450 | 11/1991 | Germany . | |
| 4203572 | 11/1992 | Germany . | |
| 2025834 | 1/1980 | United Kingdom . | |

*Primary Examiner*—C. Scott Bushey
*Attorney, Agent, or Firm*—Wenderoth, Lind & Ponack

[57] ABSTRACT

A tool set type powder compacting press is proposed which is simple in construction and reliable. The driving shafts coupled through coupling shafts with the tool holding plates, that is, the punch plates are provided at the press side. Further, coupling mechanisms having removable joints are provided between the driving shafts and the punch plates. No driving device is provided at the tool set side. Since the driving mechanisms are integrated at the press side, the whole arrangement will have a simple construction. This will also increase the reliability.

11 Claims, 3 Drawing Sheets

TOOL SET TYPE POWDER COMPACTING PRESS

BACKGROUND OF THE INVENTION

This invention relates to a powder compacting press which uses tool sets to manufacture powder compacts such as sintered parts.

With a powder compacting press, a plurality of tools (including a die, a core and punches) are used to make a compact with a complicated shape having two or more steps. In the tool sets, a plurality of tools are mounted on respective tool holding plates. The tool holding plates are guided by guide rods to keep them parallel to one another. Some of the tools are operated by driving mechanisms such as a cylinder attached to the tool holding plates or by mechanical interlocking mechanisms.

In order to increase the rate of operation of the press, it is a general practice to provide a plurality of tool sets on a single press. Therefore, it is necessary to provide as many driving mechanisms as there are tool sets. When changing the setup, it is necessary to couple the driving mechanisms to a hydraulic, pneumatic or electric power source. Also, the operation control mechanism and the tool position adjusting mechanism have to be attached to each tool set. This will increase the cost of the tool sets and the time used to couple the driving source. Further, there is a problem that the various tool sets have different functions with respect to one another.

SUMMARY OF THE INVENTION

It is an object of the present invention to provide a tool set type powder compacting press which obviates this problem.

According to the present invention, there is provided a tool set type powder compacting press having a tool set including an upper punch, a lower punch, a die and a core. At least one of the upper punch and the lower punch comprises a plurality of tools, and tool holding plates which are as many in number as the tools and hold the respective tools. The press is provided with driving shafts for operating the respective tool holding plates, the driving shafts being provided with means for controlling the operation and position of the driving shafts. Coupling means are provided for coupling the driving shafts with the tool holding plates, and the coupling means comprise removable joints.

No adjusting mechanism for operation or positioning is provided at the tool set side. Therefore, controls of speed, position and power by means of electric or hydraulic servo control, by hydraulic/pneumatic pressure control or by other control are carried out only for the driving shafts.

If there is play or rattling at the connection between the tool holding plate of the tool set and the driving shaft in the press, it may unduly affect the quality of the products. Clamp mechanisms may be provided so that the joint portions for coupling can move in the axial direction to eliminate the gap between the joint portions.

The operation of the tool holding plates in the tool sets is controlled by hydraulic/pneumatic pressure control or by electric/hydraulic numerical servo control. Also, mechanical means such as a hydraulic or pneumatic cylinder or a ball screw is generally used as a driving mechanism. However, such mechanisms are affected by many factors that might cause bad effects on the control accuracy, such as internal leakage of hydraulic/pneumatic pressure, and differences in the frictional resistances and in dimensional accuracies among the components in these mechanisms. Therefore, if the driving mechanisms are provided at the tool set side, there will be differences in the control accuracy among a plurality of tool sets. This unduly affects the quality of products.

More specifically, the acceleration in the early phase of operation will vary due to the differences in sliding resistances in the cylinder rams and the differences in the internal fluid leakage. These differences in control accuracy will create differences in the compacting density in the products and may develop cracks. Furthermore, they will affect maintenance and durability with prolonged use. The greater the number of the tool sets, the greater the bad effects.

In the press according to the present invention, driving shafts are provided for the tool holding plates at the press side. Thus, the factors which create differences in control accuracy are reduced to a minimum, thereby reducing bad effects on control accuracy.

Usually, the adjusting mechanisms for controlling the operation and the position of the driving mechanisms are provided on the driving mechanisms. However, in the present invention, since no driving mechanism is provided at the tool set side, the number of adjusting mechanisms needed is fewer.

Furthermore, if the tool holding plates in the tool sets and the rams in the press are coupled by means of joints, it is necessary to provide a gap therebetween to facilitate the fitting. This gap is usually between 0.05–0.1 mm, which is not negligible because it might delay the operation of the tool holding plate and decrease the accuracy in positioning for the tools.

In the arrangement in which the clamp mechanism is provided on the coupling means, the gap can be reduced to zero, ensuring highly accurate compacting. The force applied by the clamp mechanism to the joint in the axial direction has to be set to be not less than the force applied to the clamp during operation.

According to the present invention, since the functions are integrated at the press side, the tool sets will have a simple function. Thus, the following effects can be attained.

(1) While using a plurality of tool sets on a single press, there are no difference in function between tool sets. Therefore, compacting can be carried out under highly reproducible conditions with high reproducibility. This increases the quality of the powder compacts.

(2) Since the tool sets and the press are coupled only mechanically, neither electric nor hydraulic/pneumatic pressure coupling is necessary. This makes it possible to reduce the time necessary for setup.

(3) Troubles such as short circuits and wire breakage, which are usually caused by powder materials becoming attached to the electric connectors, and contamination of cylinder oil by powder material can be avoided. A more reliable system can be achieved.

(4) Since the tool sets are simple in structure, it becomes possible to reduce the manufacturing cost and the equipment cost as a whole. Further, a larger number of tool sets can be mounted with the same equipment cost. It becomes easier to respond to smaller manufacturing lots.

(5) No rattling will occur in the clamp mechanisms disposed in the coupling portions of the driving shaft of the press and the tool holding plate. Therefore, the powder compacts will have a higher quality.

(6) The guide arms are mounted in the T-joint for coupling. The driving shaft does not have to be positioned at the coupling position.

BRIEF DESCRIPTION OF THE DRAWINGS

Other features and objects of the present invention will become apparent from the following description made with reference to the accompanying drawings, in which.

DETAILED DESCRIPTION OF THE INVENTION

Figure 1:
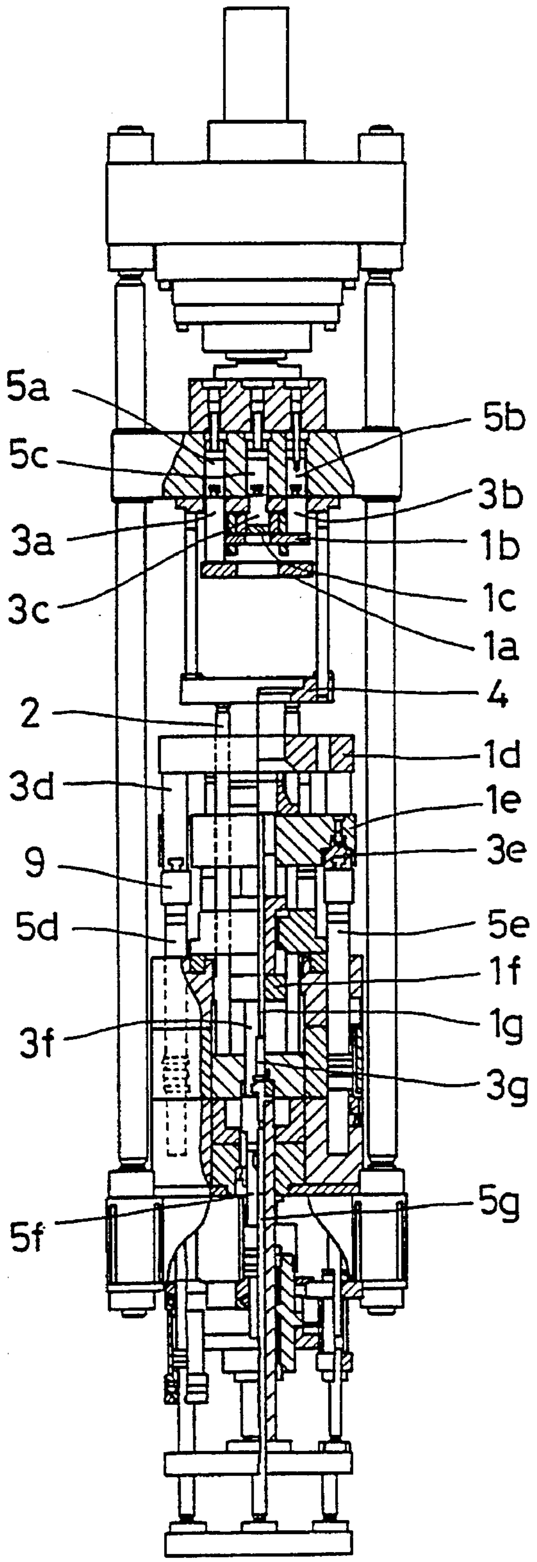
FIG. 1 is a partially cut away front view of one embodiment of a tool set type powder compacting press according to the present invention.

FIG. 1 shows an embodiment according to the present invention in which a tool set comprises tool holding plates, that is, punch plates 1*a*–1*f* and a core rod 1*g*. Each punch and core rod is secured to the respective punch plate by use of an adapter. Also, in order to keep the punch plates 1*a*–1*f* parallel with one another, they are guided by guide rods 2 so as to be movable relative to one another in the axial direction. Coupling shafts (or coupling parts) 3*a*–3*g* are secured to the punch plates 1*a*–1*f* and the core rod 1*g* on either top or bottom end thereof. These coupling shafts 3*a*–3*g* are coupled to respective driving shafts 5*a*–5*g* extending from the press.

In FIG. 1, there is illustrated a tool set coupled to the press and comprising the upper punch plates 1*a*–1*c*, the lower punch plates 1*d*–1*f*, a die plate 4, and the core rod 1*g*. The number of the plates depends upon the number of the steps which the powder compact to be formed has.

The coupling shafts 3*a*–3*g* are coupled to the driving shafts 5*a*–5*g* provided near the press, respectively, by joints shown in FIG. 2, each comprising a T-groove 6 and a T-joint (or joint member having a T-shaped head) 7. The dimensions of the T-groove 6 and T-joint 7 should be determined so that the T-joint 7 can be inserted in the T-groove 6 without any difficulty.

The clearance should generally be 0.05–0.1 mm as mentioned above. It is not necessary for the compacting process, but it may affect the movement of the tools unduly and produce defects on the powder compact, in the following ways. (i) While filling powder therein, the upper surface of the lower punch is moved out of the position due to the clearance. As a result, the amount of the powder is subject to change, causing the weights and densities of the individual powder compacts to vary. (ii) The clearance decreases the precision of fine adjustment needed to compensate the deflection of punches. Therefore, cracks may develop in the compacts due to insufficient compensation of punch deflection.

Figure 3A:
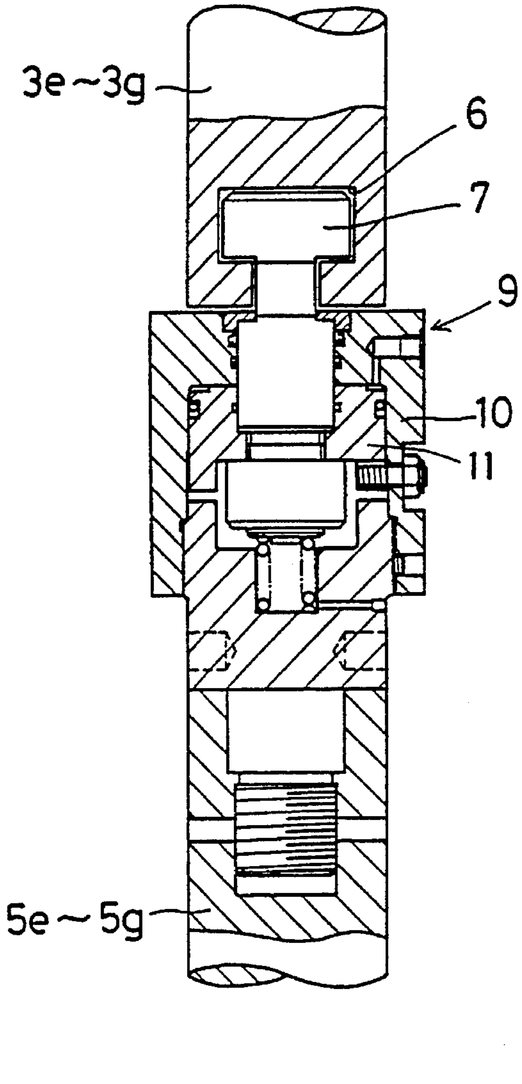
FIG. 3A is a sectional view of a clamp mechanism of the joint in its unclamped state.
Figure 3B:
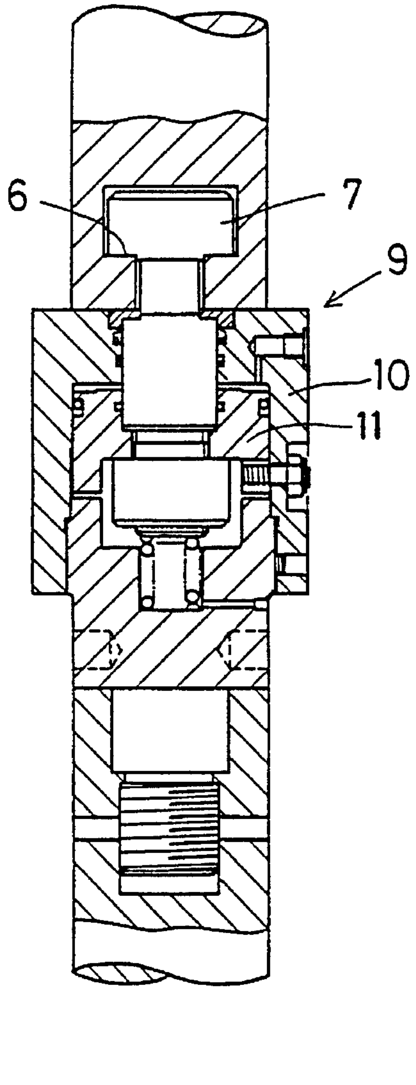
FIG. 3B is a sectional view of the clamp mechanism of FIG. 3A, but in its clamped state.

In order to avoid the above said problems, in the device shown in the drawings, a clamp mechanism (or coupling mechanism) 9 employing a clamp cylinder 10 shown in FIGS. 3A and 3B is provided for each of the coupling portions between the coupling shafts 3*e*–3*g* and the driving shafts 5*e*–5*g*, respectively. A spring pushes up a piston rod of a clamping piston in the clamp cylinder 10. The piston rod is pushed down by the fluid pressure so that the T-joint 7 integral with the piston rod is biased toward the driving shaft 5*e*–5*g* to thereby pull down the coupling shaft 3*e*–3*g*. This will reduce to zero the clearance (or play) in the coupling portion in the axial direction and obviate the problem. The clamp force produced by the clamp cylinder 10 is set to be larger than the force resisting the clamp mechanism while the press operates.

Figure 2A:
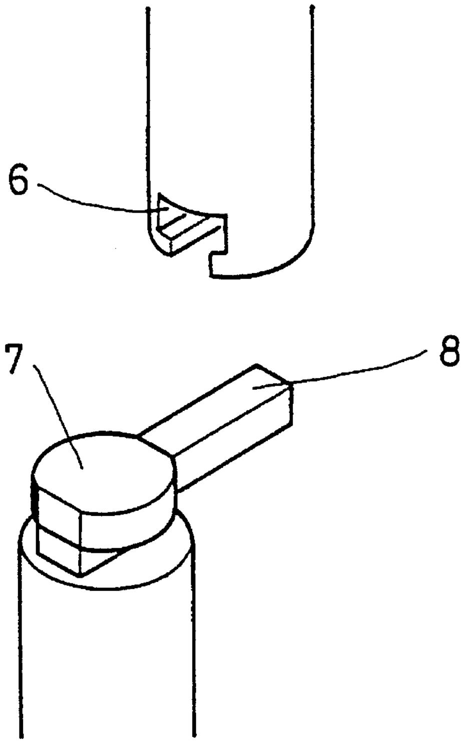
FIG. 2A is a perspective view of a joint used in coupling means of the invention.
Figure 2B:
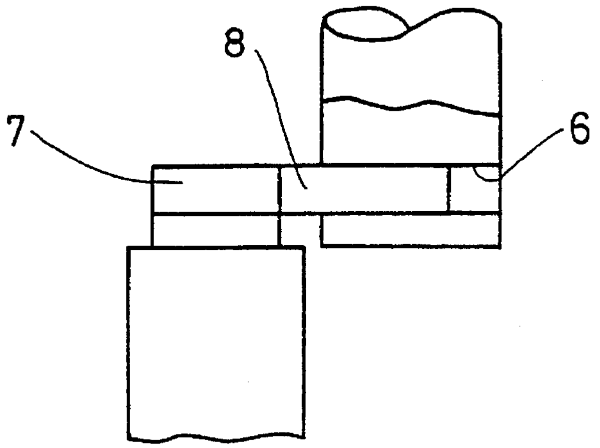
FIG. 2B is a front view of the joint of FIG. 2A, showing how it is connected.

As shown in FIG. 2A, it is preferable to provide a guide arm 8 at the head portion of the T-groove 7 so as to protrude diametrically therefrom. The width of the guide arm 8 is set to be narrower than that of the opening of the T-groove 6. As shown in FIG. 2B, the driving shaft is moved forward at low pressure with the guide arm 8 in contact with the bottom face of the T-groove 6. Thereafter, by moving the coupling shaft laterally, the driving shaft and the coupling shaft can be coupled easily without pre-positioning.

In the above arrangement, the clamp cylinder can stroke freely. Even if the contact surfaces of the T-groove 6 and the T-joint 7 are not perfectly flat or parallel to each other, this can be compensated for by the elastic deformation due to the clamp force. There is no problem in practical use. The T-groove 6 and the T-joint 7 can be brought into contact with each other perfectly since any imperfections in their flatness can be compensated for by the elastic deformation. Thus, the wear caused by lapse of time in the contact surfaces will not raise any serious problem.

The driving shafts provided at the press are controlled by the control mechanisms which are all provided in the press. In FIG. 1, scales needed to control each of the cylinders which actuate the driving shafts at the press are also provided in the press. All of the operation/position adjusting mechanisms except the one for adjusting the pressure position for each punch are provided in the press. Only the adjusting mechanism for adjusting the pressure position for each punch is provided in the tool set. When the driving shafts have enough power to support the punches at the pressing position, these adjusting mechanisms in the tool set may not be necessary.

What is claimed is:

1. A powder compacting press comprising:

an upper punch, a lower punch mounted below said upper punch and operably connected to said upper punch, and a die operably mounted between said upper punch and said lower punch, wherein at least one of said upper and lower punches comprises:

a plurality of tool holding plates;

a plurality of driving shafts;

a plurality of coupling mechanisms coupling respective driving shafts to respective tool holding plates;

wherein at least one of said coupling mechanisms includes a coupling part secured to one of said tool holding plates and a joint member axially slidably coupled to the corresponding respective one of said driving shafts;

wherein said coupling part has a T-shaped groove formed therein;

wherein said joint member includes a T-shaped head removably mounted in said T-shaped groove of said coupling part with axial play between said T-shaped head and said coupling part; and wherein said at least one of said coupling mechanisms further includes a means for biasing said joint member toward said respective one of said driving shafts to take up said axial play between said T-shaped head and said coupling part.

2. A powder compacting press as recited in claim 1, wherein said driving shafts comprise control means for controlling operation and position of said tool holding plates, respectively.

3. A powder compacting press as recited in claim 2, wherein said control means comprise a numerical servo control system.

4. A powder compacting press as recited in claim 1, wherein said at least one of said coupling mechanisms includes a plurality of said coupling mechanisms.

5. A powder compacting press as recited in claim 1, wherein said means for biasing comprises a fluid-actuated clamping mechanism including a clamping cylinder fixed to said respective one of said driving shafts, and a clamping piston fixed to said joint member and being operatively mounted in said clamping cylinder.

6. A powder compacting press as recited in claim 1, further comprising a plurality of tools mounted to said tool holding plates, respectively.

7. A powder compacting press comprising:

an upper punch, a lower punch mounted below said upper punch and operably connected to said upper punch, and a die operably mounted between said upper punch and said lower punch, wherein at least one of said upper and lower punches comprises: <a plurality of tool holding plates;

a plurality of driving shafts;

a plurality of coupling mechanisms coupling respective driving shafts to respective tool holding plates;

wherein at least one of said coupling mechanisms includes a coupling part secured to one of said tool holding plates, and a joint member axially slidably coupled to the corresponding respective one of said driving shafts;

wherein said coupling part has a T-shaped groove formed therein;

wherein said joint member includes a T-shaped head removably mounted in said T-shaped groove of said coupling part with axial play between said T-shaped head and said coupling part; and wherein said at least one of said coupling mechanisms further includes a fluid-actuated clamping mechanism including a clamping cylinder fixed to said respective one of said driving shafts, and a clamping piston fixed to said joint member and being operatively mounted in said clamping cylinder.

8. A powder compacting press as recited in claim 7, wherein said driving shafts comprise control means for controlling operation and position of said tool holding plates, respectively.

9. A powder compacting press as recited in claim 8, wherein said control means comprise a numerical servo control system.

10. A powder compacting press as recited in claim 7, wherein said at least one of said coupling mechanisms includes a plurality of said coupling mechanisms.

11. A powder compacting press as recited in claim 7, further comprising a plurality of tools mounted to said tool holding plates, respectively.

* * * * *